US011558375B1

(12) United States Patent
Cao et al.

(10) Patent No.: US 11,558,375 B1
(45) Date of Patent: Jan. 17, 2023

(54) PASSWORD PROTECTION WITH INDEPENDENT VIRTUAL KEYBOARD

(71) Applicant: Trend Micro Inc., Tokyo (JP)

(72) Inventors: Jing Cao, Nanjing (CN); Quan Yuan, Nanjing (CN); Bo Liu, Nanjing (CN)

(73) Assignee: Trend Micro Incorporated, Tokyo (JP)

( * ) Notice: Subject to any disclaimer, the term of this patent is extended or adjusted under 35 U.S.C. 154(b) by 420 days.

(21) Appl. No.: 16/716,156

(22) Filed: Dec. 16, 2019

(51) Int. Cl.
*H04L 9/40* (2022.01)
*G06F 21/31* (2013.01)
*H04L 67/306* (2022.01)
*G06F 3/04886* (2022.01)
*H04L 9/32* (2006.01)
*G06K 7/14* (2006.01)
(Continued)

(52) U.S. Cl.
CPC ...... *H04L 63/0853* (2013.01); *G06F 3/04886* (2013.01); *G06F 21/31* (2013.01); *G06F 21/34* (2013.01); *G06F 21/42* (2013.01); *G06K 7/1413* (2013.01); *G06K 7/1417* (2013.01); *H04L 9/32* (2013.01); *H04L 9/3234* (2013.01); *H04L 67/306* (2013.01)

(58) Field of Classification Search
CPC ..... H04L 63/0853; H04L 9/3234; H04L 9/32; H04L 67/306; G06F 21/34; G06F 21/42; G06F 3/04886; G06F 21/31; G06K 7/1413; G06K 7/1417
See application file for complete search history.

(56) References Cited

U.S. PATENT DOCUMENTS

2011/0191591 A1\* 8/2011 Cheng .................. G06Q 30/02 713/182
2012/0218188 A1\* 8/2012 Kashitani ............ G07F 19/2055 345/168
(Continued)

OTHER PUBLICATIONS

Dib, Ahmed; Ghazi, Sabri; "Anti-Shoulder Surfing Login Based on Multi-Entry Models on Onscreen Keyboard," 2019 International Conference on Networking and Advanced Systems (ICNAS), 2019, pp. 1-5, doi: 10.1109/ICNAS.2019.8807820.*

*Primary Examiner* — Victor Lesniewski
(74) *Attorney, Agent, or Firm* — Beyer Law Group LLP

(57) ABSTRACT

A virtual keyboard rendered on a separate computing device is independent of the user's computer. A virtual keyboard displayed on the user's computer screen is blank without any alphanumeric characters. Another virtual keyboard displayed on the user's independent computing device has a randomly generated layout of alphanumeric characters on a keypad. The user enters a password by pressing the blank keys of the blank keyboard on his computer screen with reference to the other virtual keyboard. The position sequence of these entered keys is sent to an application on a remote server computer. The remote server computer shares a virtual keyboard having the randomly generated layout of characters with the independent computing device via an online or off-line technique. When online, an encoded image of the encrypted layout is sent to the client computer and displayed for scanning by the device. When off-line, both the application and the device generate the same random key sequence by using the same pseudo random number generator and the same seed value.

12 Claims, 12 Drawing Sheets

Augmented Keyboard on Telephone

(51) Int. Cl.
*G06F 21/42* (2013.01)
*G06F 21/34* (2013.01)

(56) References Cited

U.S. PATENT DOCUMENTS

| | | | |
|---|---|---|---|
| 2014/0101595 A1* | 4/2014 | Kumara | G06F 3/04886 715/773 |
| 2014/0250518 A1* | 9/2014 | Schneider | G06F 21/34 726/9 |
| 2014/0317713 A1* | 10/2014 | Gadotti | G06F 21/36 726/7 |
| 2014/0351589 A1* | 11/2014 | Chenna | H04W 12/068 713/168 |
| 2015/0096012 A1* | 4/2015 | Chen | G06F 21/84 726/17 |
| 2015/0154414 A1* | 6/2015 | Pike | G06F 21/36 726/30 |
| 2015/0309724 A1* | 10/2015 | Wu | G06F 21/31 715/773 |
| 2015/0326565 A1* | 11/2015 | Kuang | H04L 63/0869 726/4 |
| 2015/0379260 A1* | 12/2015 | Hwang | H04L 63/0838 726/6 |
| 2016/0182495 A1* | 6/2016 | Stuntebeck | H04L 9/3234 713/165 |
| 2016/0314462 A1* | 10/2016 | Hong | H04L 63/083 |
| 2016/0314468 A1* | 10/2016 | Smith | G06Q 20/4012 |
| 2017/0032573 A1* | 2/2017 | Dow | G06F 21/606 |
| 2017/0237726 A1* | 8/2017 | Wang | H04W 12/06 726/7 |
| 2017/0324726 A1* | 11/2017 | Alleau | H04W 12/33 |
| 2018/0197180 A1* | 7/2018 | Tsai | H04W 12/02 |
| 2018/0285549 A1* | 10/2018 | Sonkar | G06Q 20/321 |
| 2018/0309744 A1* | 10/2018 | Chou | G06F 21/42 |
| 2020/0159904 A1* | 5/2020 | Bae | G09G 3/3208 |
| 2020/0220867 A1* | 7/2020 | Dedieu | H04L 63/0442 |

* cited by examiner

Password Input System

Password Input System

Virtual Keyboard on Computer

Virtual Keyboard on Telephone

Augmented Keyboard on Telephone

Augmented Keyboard on Telephone

PASSWORD PROTECTION WITH INDEPENDENT VIRTUAL KEYBOARD

FIELD OF THE INVENTION

The present invention relates generally to protection of passwords. More specifically, the present invention relates to using a separate keyboard to protect a password upon entry into a computer.

BACKGROUND OF THE INVENTION

As computers become more prevalent and users are continually asked to log in to Web sites with a user name and password, identity theft and password hacking are two of the top concerns for both individuals and businesses worldwide. More and more Web sites where user accounts are required (e.g., applications, portals, services, etc.) are asking users to choose strong passwords in addition to changing their passwords at fixed intervals in order to prevent the password from being stolen and from the account being compromised. Unfortunately, it is difficult for most users to remember strong passwords because they are more complicated.

Even when strong passwords are used, and when password are changed frequently, these methods are still unable to protect users from password theft, keyboard hooking malware, key logging malware or screen recording malware. In other words, even if a user uses a strong password with a virtual keyboard, a hacker still able to steal a password fairly easily by use of these malicious programs.

Existing solutions to this problem are not always optimal. Some accounts use two-factor authentication in which a second factor is sent over SMS. Unfortunately, this solution relies upon SMS which can often be compromised by rogue mobile applications. It is not considered a secure solution considering the possible weak authentication mechanism in the GSM network. Alternatively, the authenticator-based solution is considered an auxiliary method to prove that the current user is the actual owner of the password. But, users are still required to input their user name and password before this authenticator works, thus opening the user up to possible password theft.

Moreover, other techniques such as Google Authenticator and RSA SecureID provide a verification code that is supposed to be secure. But, this verification code is valid for at least one minute, thus, if the stolen, the code can be used by a hacker to login it to a user account using stolen login information and obtain personal information.

Therefore, further techniques and systems are desirable to thwart such attackers and malicious software in order to protect user passwords.

SUMMARY OF THE INVENTION

To achieve the foregoing, and in accordance with the purpose of the present invention, a system is disclosed that prevents an attacker from obtaining a password from a user computer.

The inventors have realized that an important part of information protection is separation of knowledge. The present invention provides a novel way to separate key pieces of information used to enter a password into a computing device, thus preventing theft of the password by malicious software. The invention is also able to enhance protection for weak passwords.

The present invention separates the actual password input on the computing device from the rendering of a keyboard. A virtual keyboard rendered on a separate computing device independent of the user's computer is used to achieve that goal. In one embodiment, a virtual keyboard displayed on the user's computer screen (for example, on the login page of a Web site) is blank, showing only empty squares of a keypad without any alphanumeric characters. Another virtual keyboard is displayed on the user's independent computing device and has a randomly generated layout of alphanumeric characters on a keypad. The user enters a password by pressing the blank keys of the blank keyboard on his computer screen with reference to the virtual keyboard on his independent computing device. Any malicious software within the user's computing device (or on the network or Web) will only be able to record a clicking sequence on the blank virtual keyboard on the computer screen and will not be able to capture any digits or characters entered. Thus, the malicious software cannot steal the entered password. An attacker will not know how to input the password in the blank virtual keyboard without having access to the virtual keyboard rendered in the independent computing device.

In a first online embodiment, a client computer sends to a server computer a user name and receives in response an encoded image that represents an encrypted key sequence of alphanumeric characters. The encoded image is displayed on the client computer so that it may be scanned by a mobile computing device. The client computer displays a blank virtual keyboard and the user enters a password by selecting a number of the blank keys by reference to another virtual keyboard on the mobile computing device which actually shows alphanumeric characters on the keys. A position sequence formed by the user selection is sent to an application of the server computer which may generate the user's password using the position sequence and the same virtual keyboard on the mobile computing device.

In a second online embodiment, a camera of a mobile computing device scans an encoded image on a screen of the client computer and then decodes that image to produce an encrypted key sequence of alphanumeric characters. The device then decrypts that key sequence and generates a virtual keyboard and locates the key sequence on the keys of the virtual keyboard. The virtual keyboard is then displayed on the device for use by a user when entering a password on a blank virtual keyboard of the client computer. The camera may also capture the blank virtual keyboard and overlays the generated virtual keyboard over the blank virtual keyboard.

In a third online embodiment, a server computer receives a user identifier and retrieves the public key corresponding to that identifier. Once a random sequence of alphanumeric characters is generated, that sequence is encrypted with the public key and then encoded to produce an encoded image. The encoded image is sent to the client computer which may then displayed for scanning by a mobile computing device. The server computer then receives a position sequence from the client computer representing a sequence of keys selected on a blank keyboard displayed on the client computer and is able to determine a password of the user account by mapping the position sequence onto the random sequence of alphanumeric characters.

In a fourth off-line embodiment, the client computer receives a login window from an application over a network connection and the user enters his or her user identifier into the login window. A blank virtual keyboard with blank keys is displayed on the client computer and the user inputs a selection of the blank keys which forms a position sequence. Preferably, the user is referencing a mobile computing device which displays another virtual keyboard showing a random sequence of displayed alphanumeric keys. The client computer sends the user identifier and the position sequence to the application of the server computer; the user's password may be determined using the position sequence and the random sequence.

In a fifth off-line embodiment, a server computer generates a key sequence of alphanumeric characters using a pseudo random number generator having a seed. A mobile computing device uses the same pseudo random number generator with the same seed to generate the same key sequence. The mobile computing device also generates a mobile virtual keyboard and locates the key sequence in a predetermined order on the keys of that keyboard. The device then displays that mobile virtual keyboard for use by a user.

In a sixth off-line embodiment, an application of a server computer generates a key sequence of alphanumeric characters using a pseudo random number generator having a seed. The server computer receives over a network connection a user identifier from a client computer and a position sequence from a virtual keyboard displayed on the client computer. The server computer is able to determine a password of the user by mapping the position sequence onto the key sequence of alphanumeric characters. The application then logs the client computer in when it is determined that the determined password matches a stored password for that user in a database of the application.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

Online Embodiment

Figure 1:
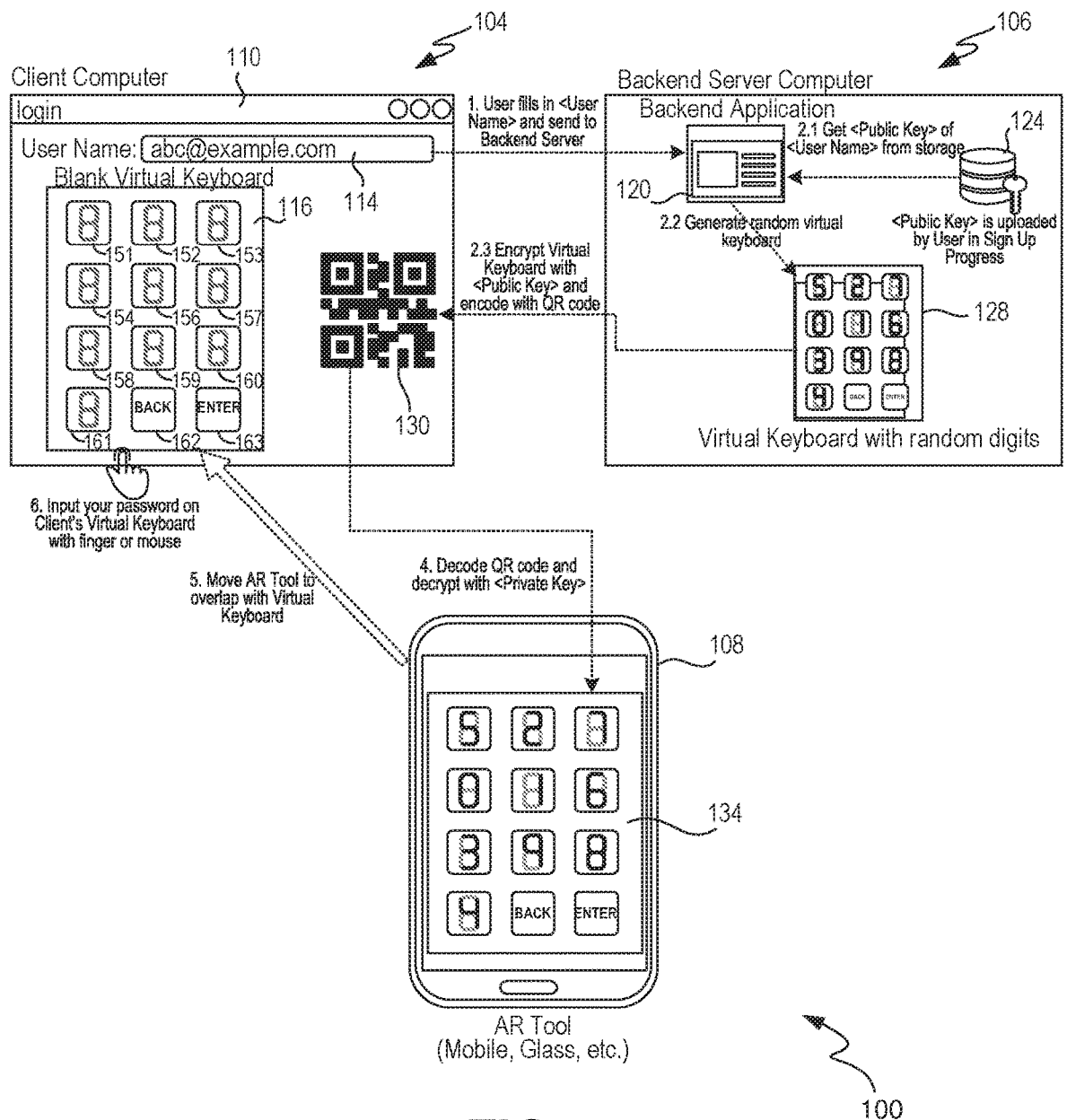
FIG. 1 illustrates a password input system according to one embodiment of the invention.

FIG. 1 illustrates a password input system 100 according to one embodiment of the invention. The system includes a client computer 104 (not shown in this figure), a backend server computer 106 and a client augmented-reality (AR) tool 108 such as a mobile telephone, tablet computer, a Google glass device, a headset such as HoloLens, or any similar computing device. In fact, tool 108 may be any computing device having a camera, and having the ability to install and execute an application and connect over a wired or wireless connection to the backend server computer 106.

The client computer 104 may also be any computing device such as a desktop computer a laptop computer, tablet computer or mobile telephone, which the user is using to access a Web site over a network connection (such as the Internet) and is attempting to login to the Web site or associated Web application. Shown is a login window 110 that includes a user name field in which the user has typed in his or her user name "abc@example.com" in an attempt to log into the Web site "example.com."

In a step 1 this user name is sent to the backend server computer that implements the Web site. Executing upon that server computer is a backend application 120 used to validate a user's user name and password. Also located upon server computer 106 (or able to be accessed by the computer) is a database 124 holding pairs of user names and public keys. Previously, each user has generated a pair of a public key/private key; the public key is stored in conjunction with the user's user name in database 124 and the user retains the private key and keeps it secret. In a step 2.1 the backend application retrieves the public key from database 124 using the user name.

In a next step 2.2 the backend application generates a virtual keyboard 128 having a random layout of alphanumeric characters such as the numerals shown. This keyboard 128 can be represented as a sequence of keys, or numerals such as: 5, 2, 7, 0, 1, 6, 3, 9, 8, 4. Next, this virtual keyboard (or rather, the sequence) is encrypted with the user's public key and may be encoded in the form of a QR code which is sent in a step 2.3 to the login window 110 of the user's computer. The QR code 130 then appears on the screen of the user's computer.

Next, the user utilizes his computing device 108 (such as a mobile telephone) to take a photograph of the QR code 130 and an application on the mobile telephone decodes the QR code and decrypts it using the user's private key in a step 4. As shown, the virtual keyboard 134 on the user's computing device 108 has the same random layout of digits as keyboard 128.

Next, the user may bring the telephone 108 close to the screen of his or her computer (or may overlap the two devices) in a step 5, and in a step 6 inputs the user's password on the blank virtual keyboard 116 with reference to the virtual keyboard 134. For example, if the users password is "1234", then the user presses the blank key on the virtual keyboard 116 that corresponds to the position of the desired digits on keyboard 134. Thus, on the virtual keyboard 116 the user presses the second key in the second row, then the second key in the first row, then the first key in the third row, and finally the first key in the fourth row. The sequence of the key positions that are pressed and then sent from the client computer to the backend application 124 and attempt to password match with the user's correct password.

Figure 2:
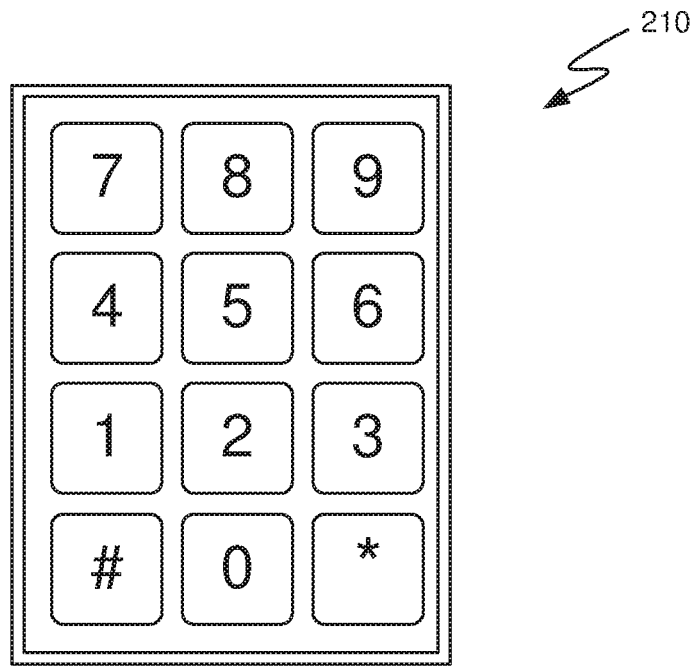
FIG. 2 illustrates the format of a suitable virtual keyboard that may be used with the present invention.

FIG. 2 illustrates the format of a suitable virtual keyboard 210 that may be used with the present invention. In this example, the keys are arranged in four rows of three keys each. When presented on login screen 110, this virtual keyboard is presented in that arrangement but each key is blank. When the backend application creates its virtual keyboard in this arrangement it will randomly place each of the 10 digits (and characters) in one of the positions shown rather than in their standard position.

Figure 3:
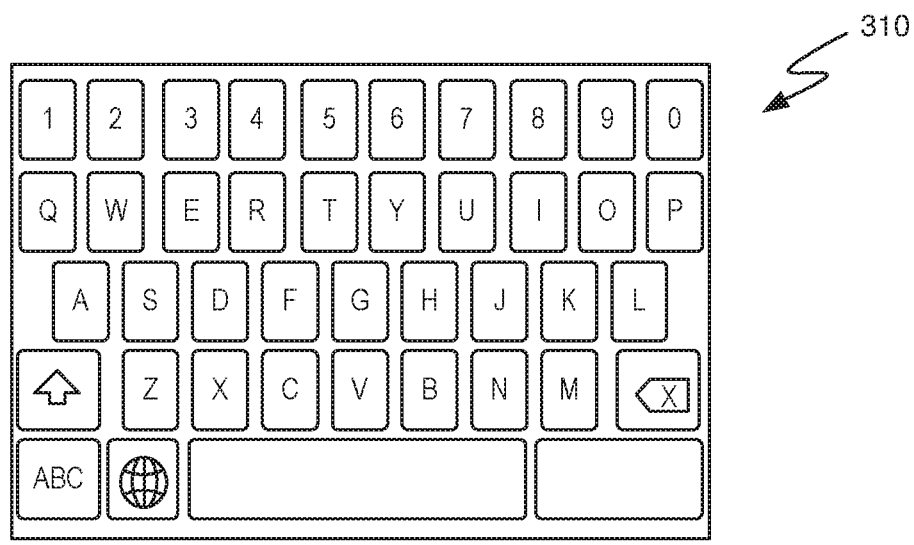
FIG. 3 illustrates the format of a suitable virtual keyboard that may be used with the present invention.

FIG. 3 illustrates the format of a suitable virtual keyboard 310 that may be used with the present invention. In this example, the keys are arranged in five rows having a different number of keys. When presented on login screen 110, this virtual keyboard is presented in that arrangement but each key is blank. When the backend application creates its virtual keyboard in this arrangement it will randomly place each of the 10 digits and characters in one of the positions shown rather than in their standard position.

Flow Diagram—Online Embodiment

Figure 4A:
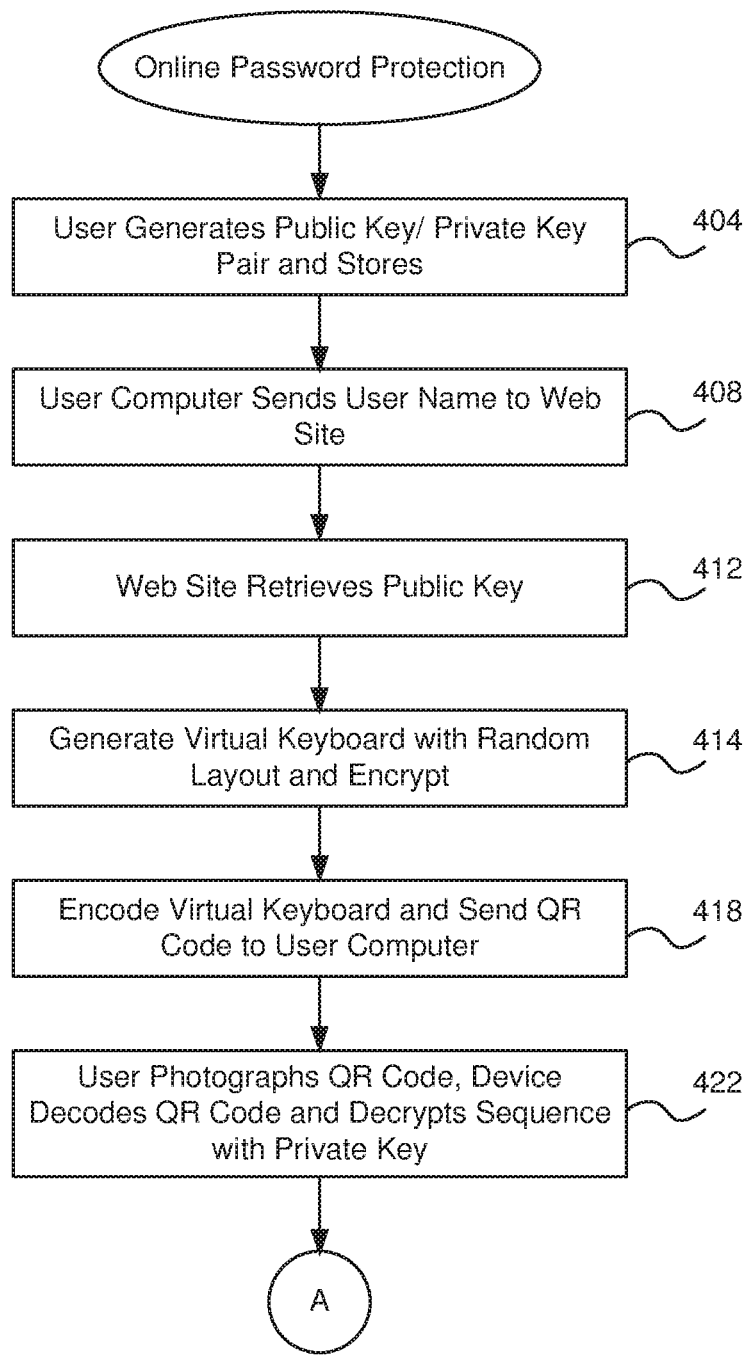
FIGS. 4A and 4B are a flow diagram describing an online embodiment for protecting a user's password.
Figure 4B:
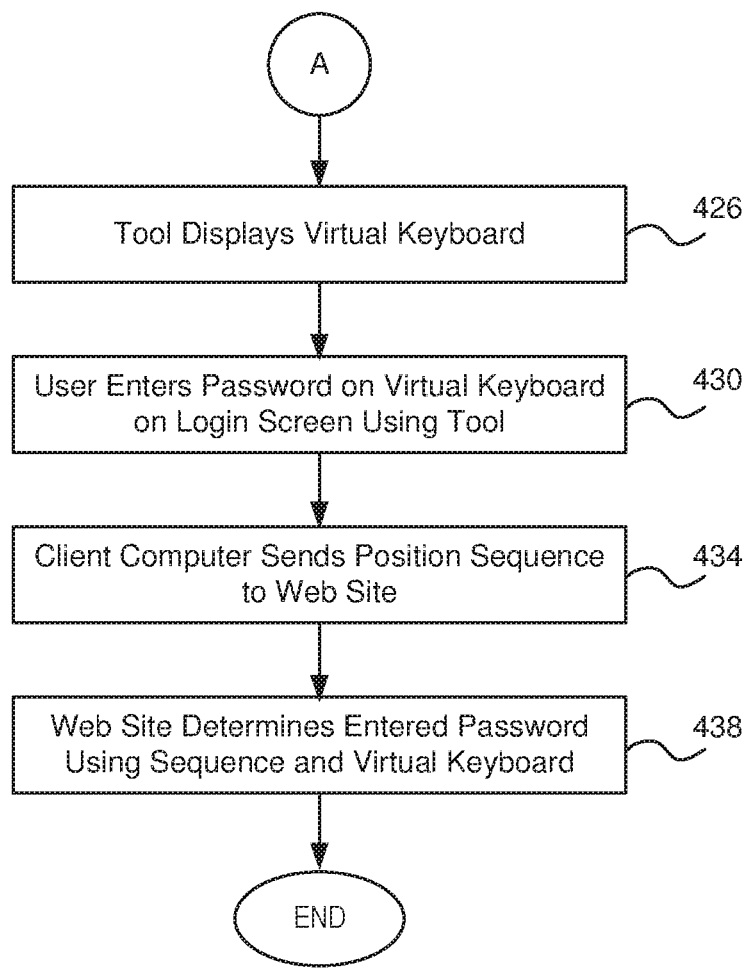

FIG. 4 is a flow diagram describing an online embodiment for protecting a user's password. In this online embodiment, the user computer 104 exchanges information with the backend server computer 106 during the login process in order to receive a random virtual keyboard.

In a first step 404 user generates a public key/private key pair as is known in the art and may use a service such as OpenSSL. Once generated, the user then uploads his or her public key during registration on a particular Web site hosted by backend server computer 106, or, this public key may be uploaded to that Web site in conjunction with the user's account information (such as with the user's user name) at any other suitable time. Using a suitable AR tool 108 (such as a mobile telephone) the user also imports the private key into a suitable application on that telephone. This importing may be done via an SMS message, an e-mail message, a wireless link, etc. The user may also generate the public key/private key pair using an application on tool 108 and then upload the public key to the Web site using the application on the telephone, storing the private key within the application on the mobile telephone. When the backend application 120 receives the user's user name and the uploaded public key it stores this data together in database 124 for later retrieval during a login process.

Next, in step 408 the user accesses the Web site on backend server computer 106 from his or her client computer 104 in an attempt to log in. The user first enters his or her user name in field 114 and makes a selection on that screen in order to send the user name to the backend application. Next, in step 412 the backend application of the Web site retrieves the user's public key from database 124 using the received user name.

In step 414 the backend application generates a virtual keyboard using a particular keyboard arrangement such as that shown at 128. As mentioned above, the particular keyboard arrangement that the backend application uses may be any suitable keyboard arrangement such as those shown in FIGS. 1, 2 and 3, among others. The particular keyboard arrangement chosen in step 414 will be the same keyboard arrangement displayed on the client computer (but with blank keys), and will be the same keyboard arrangement shown on the user's computing device 108 (the keys having alphanumeric characters). Once the keyboard arrangement is chosen, the backend application generates a random layout of alphanumeric keys on the keyboard arrangement, such as in virtual keyboard 128. As most keyboards are arranged in rows and columns, the backend application generates a sequence of keys in a predetermined order that represents the virtual keyboard. For example, the sequence for virtual keyboard 128 is: 5, 2, 7, 0, 1, 6, 3, 9, 8, 4, going from top to bottom and from left to right. Even for other keyboard arrangements, which may not necessarily be arranged in rows and columns, the backend application will still generate a random sequence of keys in a predetermined order based upon the arrangement. A PRNG described below may be used to generate the sequence.

The backend application then encrypts this particular sequence with the user's public key. Other forms of encryption are possible in order to prevent the theft of the sequence of keys when it is sent from the backend server computer to the client computer. By way of example, symmetric encryption may be used although this would then require that the symmetric key be shared between the backend computer and the client computer.

Next, in step 418 the encrypted sequence is preferably encoded in some fashion in order to transmit it to the client computer. It is not strictly necessary that the encrypted sequence be encoded before it is transmitted, but encoding facilitates access to the encrypted sequence by the user on the client computer. For example, the encrypted sequence is encoded as a QR (quick response) code and then transmitted to be displayed within login window 110 on the client computer. Use of the QR code enables the user to easily photograph the code with a mobile telephone in order to obtain the sequence of keys and does not require that the client computer execute any additional software. Other types of encoding that may also be used include a traditional barcode, a two-dimensional barcode, a matrix code, or any similar representation of alphanumeric data that can be scanned or photographed by a camera and then interpreted by software to reveal the underlying alphanumeric data.

As mentioned, it is possible that the encrypted sequence of keys be simply sent as is to the client computer. If sent in this manner, the client computer would execute additional software in order to transmit the encrypted sequence to the mobile telephone 108. Or, the user may manually input the encrypted sequence into the mobile telephone. Because the sequence is always encrypted upon the client computer it is extremely difficult if not impossible for malicious software to obtain the actual sequence of keys.

Once displayed within login window 110, in step 422 the user photographs the QR code 130 using his or her mobile telephone 108 and the application executing upon the mobile telephone decodes the QR code in order to obtain the encrypted sequence of keys. One of skill in the art will be able to decode a QR code in order to obtain any alphanumeric sequence represented by the QR code, in this case, the encrypted sequence of keys. Next, the application decrypts the encrypted sequence using the user's private key.

In step 426 the application then executing upon tool 108 displays virtual keyboard 134, for example. Because the application executing upon tool 108 works in concert with the backend application 120, it is also aware of the keyboard arrangement used to generate virtual keyboard 128. Thus, the application is able to generate a blank virtual keyboard 134, using the same keyboard arrangement as in keyboard 128, and then populate the keyboard layout using the decrypted sequence of keys in order to display virtual keyboard 134 which is the same as virtual keyboard 128.

Virtual keyboard 134 may be displayed upon mobile telephone 108 in different manners. It may be a simple graphical image as shown, which the user uses as a reference in order to enter his or her password onto the blank keyboard 116. When used in this manner, it is not strictly necessary that telephone 108 be moved close to the client computer or overlap with keyboard 116, although that may be desirable from the user's point of view. In an alternative embodiment, the application initiates the camera function of the telephone 108 and overlays a transparent or semi transparent image of keyboard 134 over the scene being viewed by the camera.

Thus, when the user holds the telephone in front of the client computer, such that keyboard 134 overlaps with the image of keyboard 116 as seen by the camera, the user is able to see the numeric keys of keyboard 134 superimposed over their respective blank keys in keyboard 116.

In another alternative embodiment, augmented reality is used to superimpose keys in step 426 and will be discussed in greater detail below. In particular, the techniques of capturing the virtual keyboard 116 in the camera viewfinder, superimposing keyboard 134 over 116, displaying the entered password on a display of the tool 108, all described below in FIG. 10 and in steps 812-816, may be used in this online embodiment in steps 426 and 430.

In step 430 the user then enters his or her password on virtual keyboard 116 within login window 110, using as reference keyboard 134 on computing device 108. The user selects any of keys 151-163 using a mouse, finger, stylus or other input means. When the password is entered upon blank keyboard 116, the entered password creates a sequence of key positions. As shown in keyboard 116 each key represents a key position, generally in increasing order starting from the top row and reading left to right. Thus, keys 151-153 are in key positions "1, 2, 3", keys 154-157 are in key positions "4, 5, 6", keys 158-160 are in key positions "7, 8, 9", and keys 161-163 are in key positions "10, 11, 12." Thus, when the password "1234" is entered upon keyboard 116 using keyboard 134 as a reference, the sequence of key positions pressed are "5, 2, 7, 10."

Next, in step 434 the client computer (via its browser) sends this captured position sequence "5, 2, 7, 10" to the backend application of computer 106.

In step 438 the backend application uses the virtual keyboard 128 it had previously generated, along with a priori knowledge of which key position refers to which key on the keyboard arrangement that is in use, in order to obtain the actual password entered by the user. In this example, since the position sequence is "5, 2, 7, 10" the application applies that to keyboard 128 in order to obtain an entered password of "1234."

Finally, the backend application uses that entered password to compare against the registered password for the user corresponding to the user name entered and determines whether or not the login should be allowed. If the passwords match then the user is allowed to login to the Web site via the backend application, but if the passwords do not match the user is not allowed login. Advantageously, malicious software (whether executing upon the client computer or in another location) is not able to steal the user's password because that password is never entered directly upon the client computer and a password is never transmitted between the client computer and backend server computer 106.

Offline Embodiment

Figure 5:
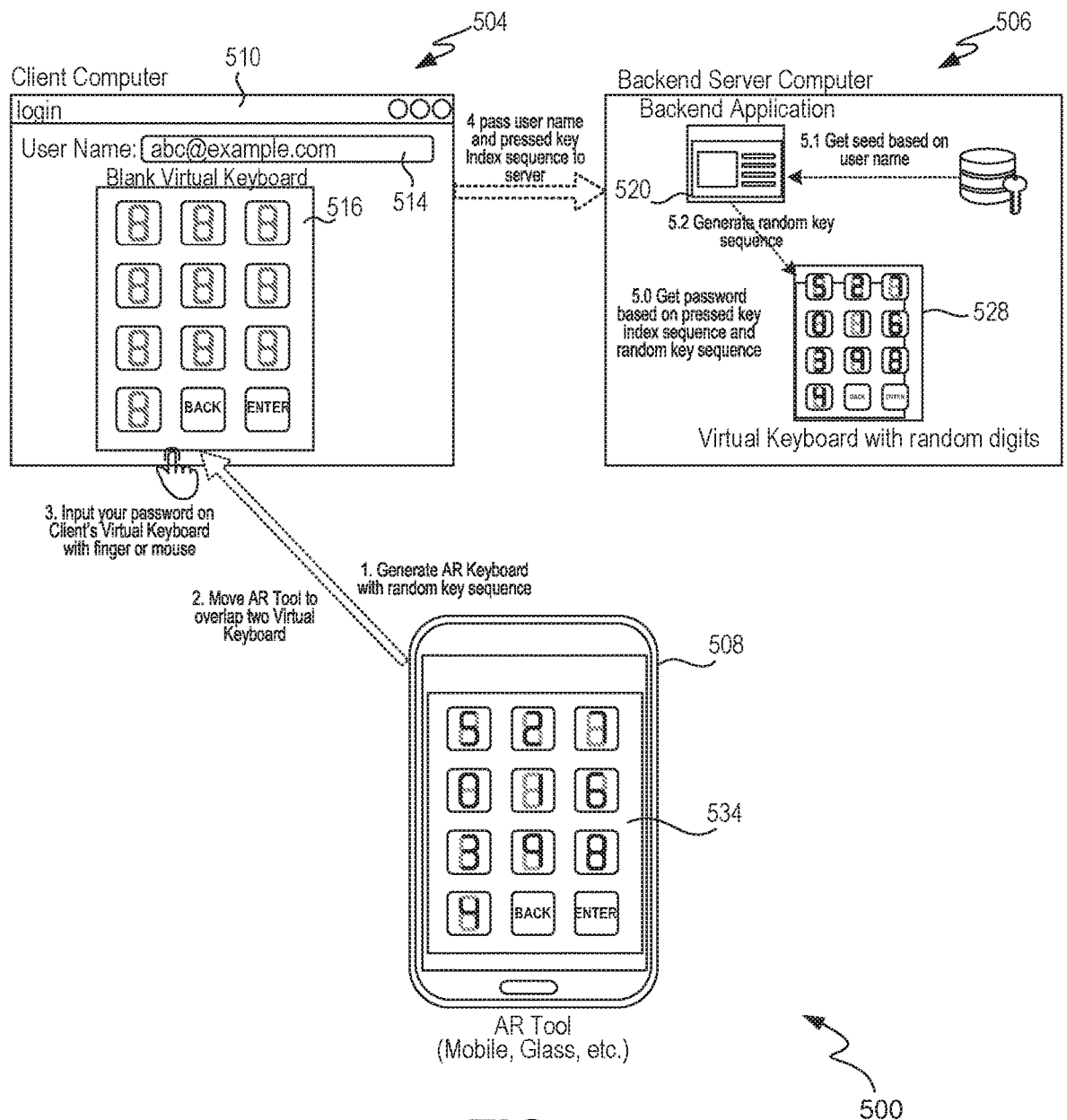
FIG. 5 illustrates a password input system according to second embodiment of the invention.

FIG. 5 illustrates a password input system 500 according to second embodiment of the invention. The system includes a client computer 504 (not shown in this figure), a backend server computer 506 and a client augmented-reality (AR) tool 508 such as a mobile telephone, tablet computer, a Google glass device, a headset such as HoloLens, or any similar computing device. In fact, tool 508 may be any computing device having a camera, and having the ability to install and execute an application and connect over a wired or wireless connection to the backend server computer 506.

The client computer 504 may also be any computing device such as a desktop computer, a laptop computer, tablet computer or mobile telephone, which the user is using to access a Web site over a network connection (such as the Internet) and is attempting to login to the Web site or associated Web application. Shown is a login window 510 that includes a user name field in which the user has typed in his or her user name "abc@example.com" in an attempt to log into the Web site "example.com."

Figure 6:
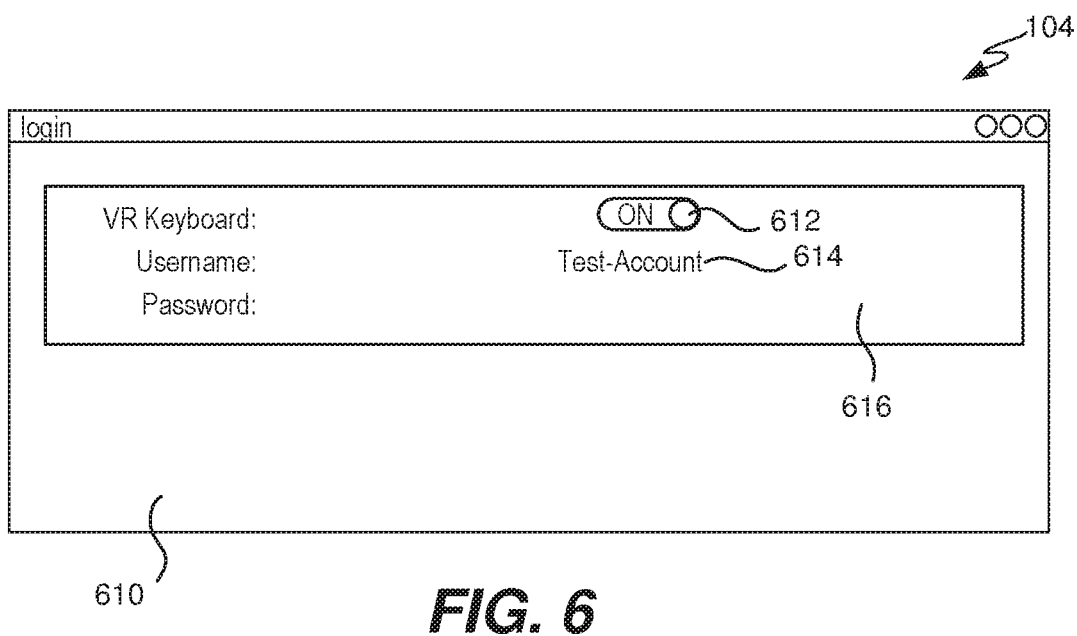
FIG. 6 illustrates a login window on a client computer.

In a step 1 the telephone 508 generates a keyboard layout 534 based upon a priori knowledge and need not communicate with the backend server computer doing this login process. In a step 2, the user moves the telephone to overlap with virtual keyboard 516 such that an augmented reality application on the user's telephone displays the numbered keys over the blank keys. In a step 3 the user selects blank keys on the computer using a finger, mouse or other implement, utilizing the overlaid keyboard 534, in order to generate a position sequence of entered keys. Next, in a step 4 the login window (or browser) sends both the user name and the input position sequence to the backend application 520 on the backend server computer. In a step 5.1 the application retrieves a seed value based upon the user name and generates 5.2 a pseudorandom key sequence in order to produce virtual keyboard 528. Because the seed value and algorithm are the same as used on telephone 508, the keyboard layout of virtual keyboard 528 will be the same as the keyboard layout of the virtual keyboard 534. In step 5.3 the application obtains the actual password entered by the user based upon virtual keyboard 528 and the input position sequence from the client computer. This actual password may then be compared against the password stored by the backend server computer in conjunction with the user's user name FIG. 6 illustrates a login window 610 on client computer 504. There is a user name field 614 to enter a user name and a password field 616 entry of the password. In addition, a VR keyboard button 612 allows the user to enable a virtual keyboard for use with the present invention. When "off," the virtual keyboard does not appear and the user simply enters his or her password in field 616 as normal. When "on," the virtual keyboard 516 will appear when the user hovers the mouse (or touches or otherwise selects) field 616.

Figure 7:
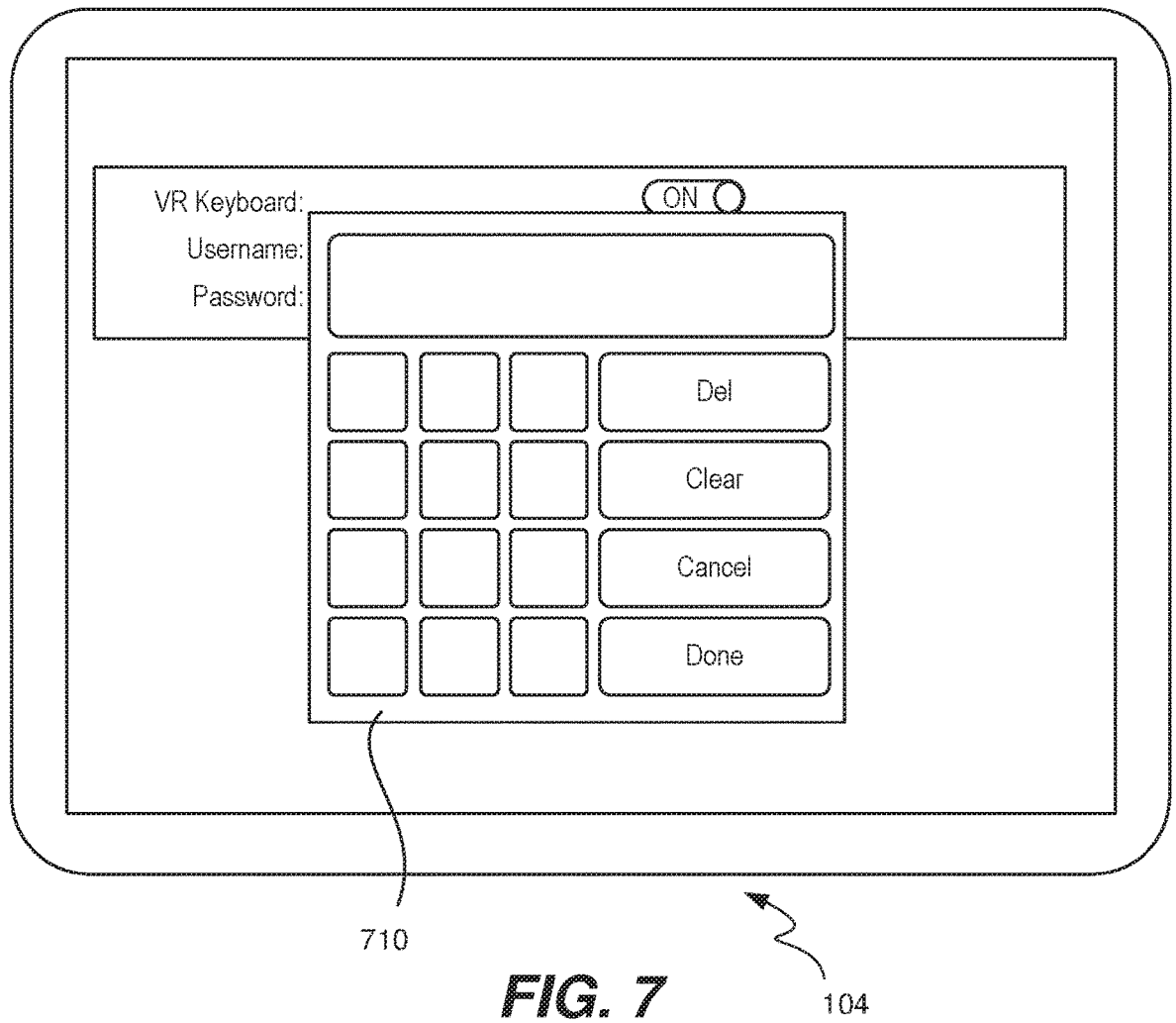
FIG. 7 is a virtual keyboard having blank keys that appears on the client computer when enabled and selected by the user using a window.

FIG. 7 is a virtual keyboard 710 having blank keys that appears on the client computer when enabled and selected by the user using window 610.

Figure 8:
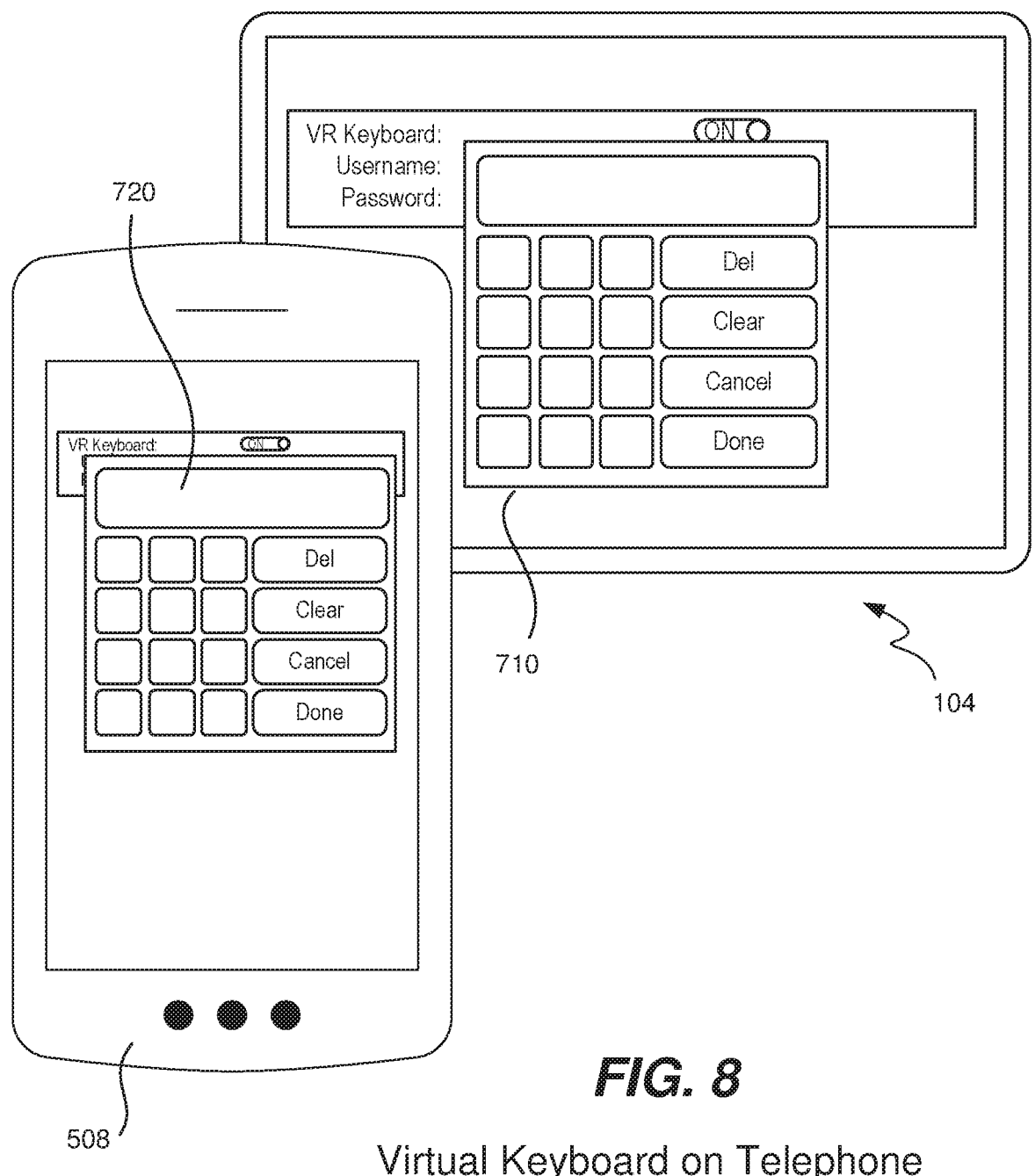
FIG. 8 shows a virtual keyboard that appears on a telephone.

FIG. 8 shows a virtual keyboard 720 that appears on telephone 508. As will be described in greater detail below, an application on telephone 508 generates keyboard 720 when telephone 108 overlaps with keyboard 710 and the viewfinder of the camera of the telephone views keyboard 710.

Figure 9:
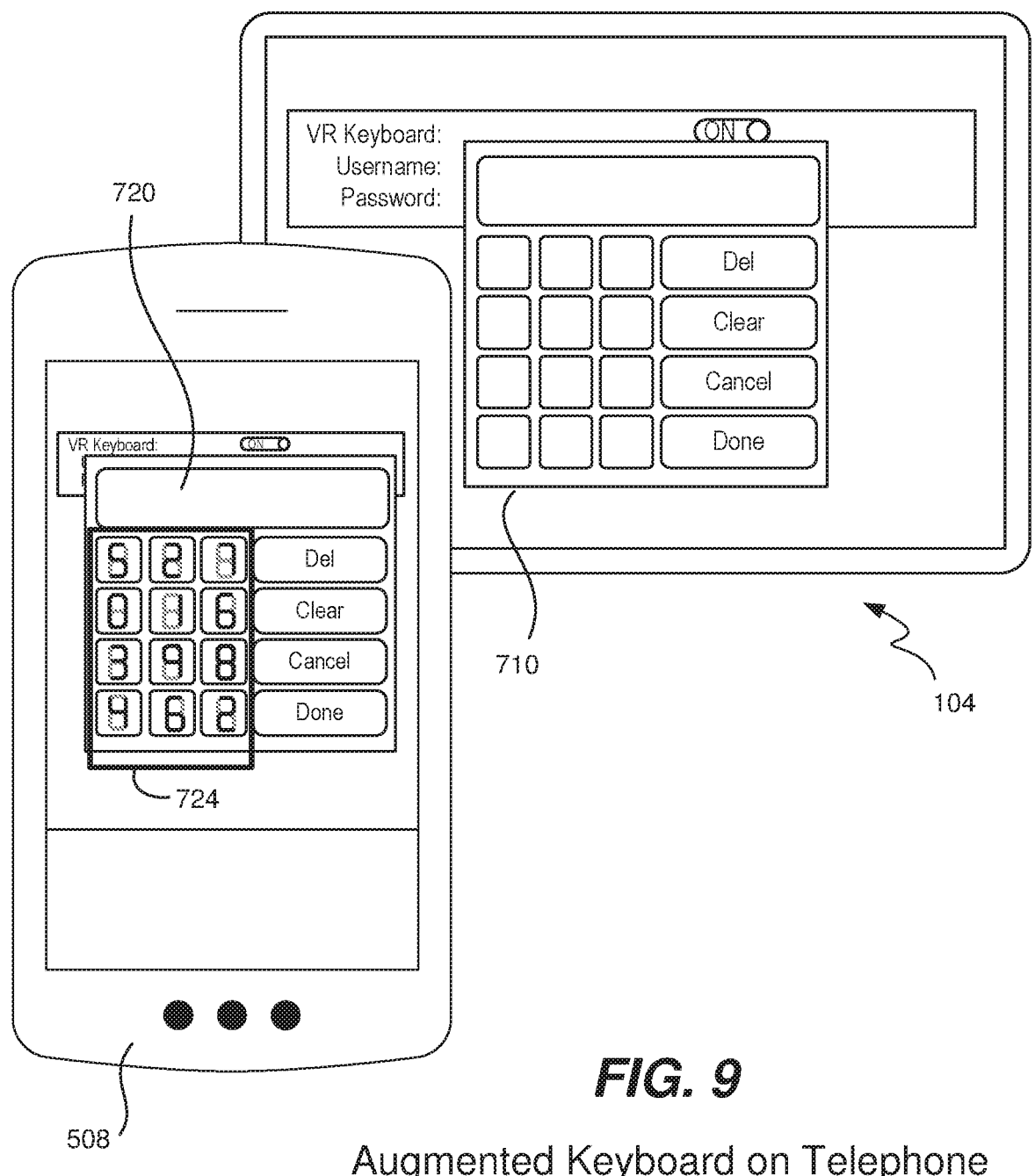
FIG. 9 shows an augmented keyboard overlaid over a keyboard.

FIG. 9 shows augmented keyboard 724 overlaid over keyboard 720. As will be described in greater detail below, the application on the telephone generates keyboard 724 after the application has rendered keyboard 720 on the telephone.

Figure 10:
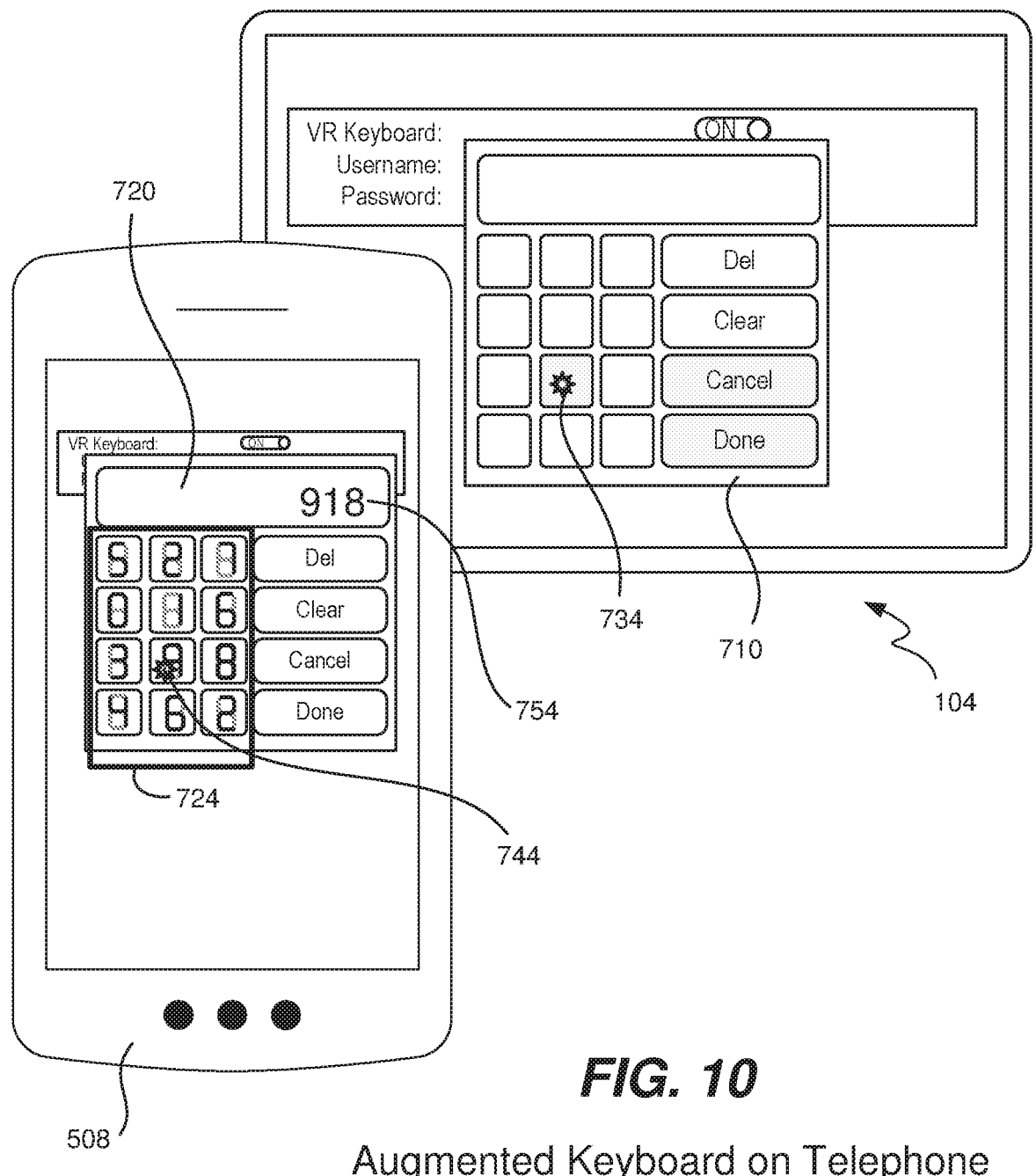
FIG. 10 illustrates an augmented keyboard on the telephone after the user has entered a password.

FIG. 10 illustrates augmented keyboard 724 on the telephone after the user has entered a portion of a password. As shown, the user has selected the digits "918" and is prepared to select the next numeral "9" (as shown by the moving finger cursor 744 on keyboard 724) by pressing key 734 on virtual keyboard 710. Advantageously, the position sequence selected by the user on keyboard 710 will not reveal on the client computer which are the actual numerals that the user has selected, and those numerals will not be displayed on the client computer. Nevertheless, this position sequence (e.g., third row, second key; second row, second key; etc.) can later be interpreted by the backend application to determine which was the password entered.

As shown, device 508 is slightly off to one side of the display of computer 104 (in order to show keyboard 710 clearly in this example), yet still has keyboard 710 in its viewfinder so that the display of device 508 can show keyboard 710 with augmented keyboard 724. Preferably, the user holds device 508 more or less directly in front of the display of the client computer, and the plane of the back of the device parallel to the plane of the computer display, so that keyboard 710 can be captured clearly in the viewfinder. Nevertheless, as shown, it is possible for device 508 to be off to one side of keyboard 710, in which case device 508 (and its camera) will not be parallel to the computer display, but will be angled slightly so that the camera of the device can still capture keyboard 710. The slight effect of that angle can be seen in FIG. 10.

Flow Diagram—Offline Embodiment

Figure 11:
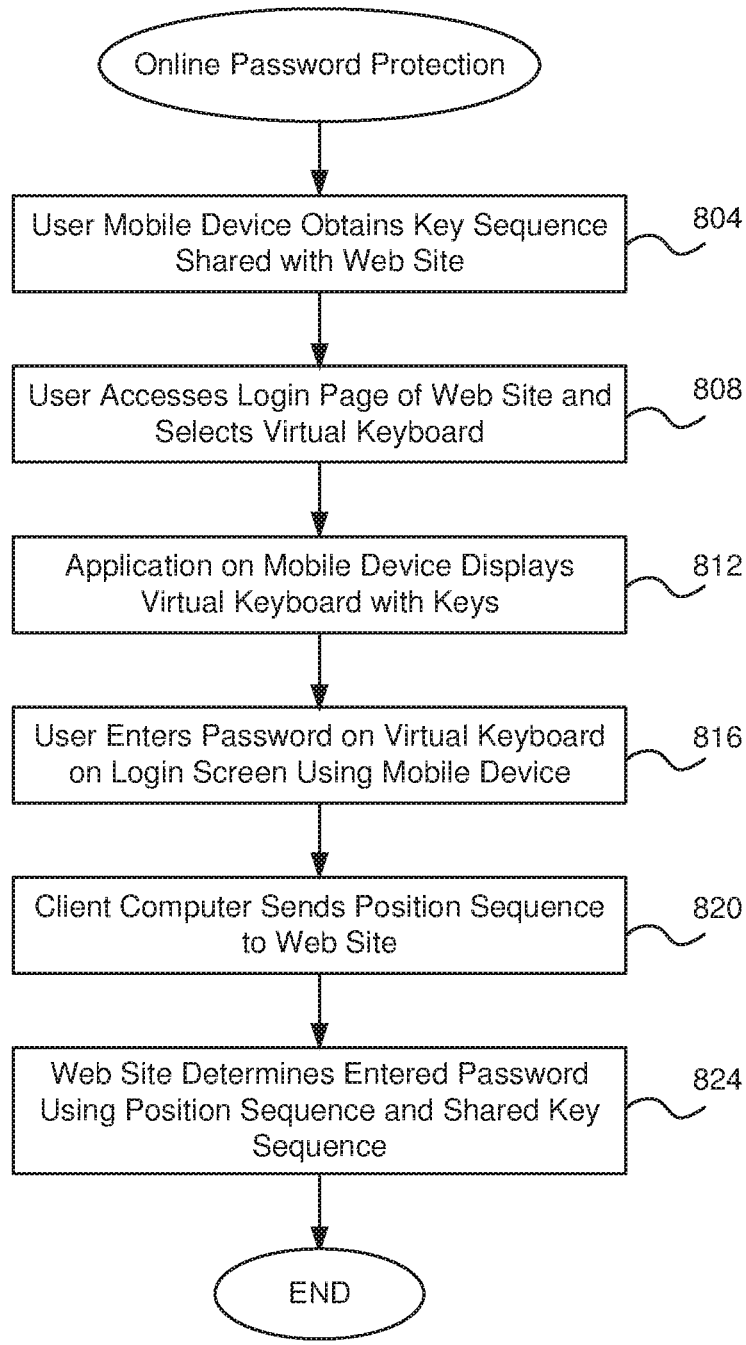
FIG. 11 is a flow diagram describing an offline embodiment for protecting a user's password.

FIG. 11 is a flow diagram describing an offline embodiment for protecting a user's password. In this offline embodiment, the user's computing device 508 will have a priori knowledge of the preferred keyboard arrangement (i.e., the keyboard layout) and of the virtual keyboard used by the backend application, and thus there is no need for the client computer to exchange information with the backend server computer during the login process nor for the computing device to read information from the client computer during the login process.

In this embodiment, a pseudo random number generator (PRNG), which are known to those of skill in the art, generates a sequence of numbers whose properties approximate the properties of a sequence of random numbers. The PRNG generated sequence of numbers can be reproduced by another computing device using the same initial value (the "seed"). Thus, a PRNG is suitable to generate a random key sequence in different places and can be used by two different computing devices. As is known in the art, a wide variety of algorithms may be used to implement a PRNG based upon an initial seed value. The AR tool 508 in possession of the user 520 will use the same seed value and algorithm as the backend application 520. Using this technique, there is no need to use any public key/private key pair, symmetric keys, nor any need to exchange virtual keyboards or sequences between the client computer and the backend server computer.

In a first step 804 the user computing device 508 (such as a mobile telephone) obtains a random key sequence that will be the same key sequence shared with background application 520 of the Web site to which client computer 504 is attempting to login. The random key sequence may be generated based upon the following initial seed value and algorithm which are also used by backend application 520:
seed=UUID+current interval since FIXED_TIME
   keys=[0, 1, 2, 3, 4, 5, 6, 7, 8, 9]
   random_keys=[ ]
   count=len(keys)
   while count>0:
     random_value=PRNG(seed)
     key_index=random_value % len(keys)
     selected_key=keys[key_index]
     random_keys.append(selected_key)
     keys.remove(selected_key)
     count-=1
In above algorithm, the UUID (universally unique identifier) and FIXED_TIME are synchronized between computing device 508 and backend application 520 at a prior time and can be synchronized again at any time; thus, both device 508 and application 520 are able to generate the same random key sequence at a given point in time. The seed value can be changed at certain intervals, for example, every minute, hour, day etc. So, in every interval the random key sequence will be the same between device 508 and application 520 as long as they have same UUID. Typically, both device 508 and application 520 will share the convention that the generated key sequence will be applied to the keys of a virtual keyboard from top to bottom, from left to right. Thus, the key sequence can be up applied consistently on each virtual keyboard 534 and 528 no matter whether the keyboard is 4×3, 1×9, etc. In situations such as use of the keyboard in FIG. 3, two different seeds and algorithms may be used, one to generate the ten numerals and one to generate the 26 characters. It is also possible to use a single seed and algorithm for the keyboard of FIG. 3. Therefore, the application on mobile telephone 508 uses the shared seed and above algorithm to generate a random key sequence of the ten digits as described above.

This step may occur at any time prior to, or in conjunction with, the user attempting to log in to the Web site using window 510, but preferably occurs in conjunction with login so that the "current interval" in the above algorithm will be the same for telephone 508 as it is for backend application 520. Device 508 and application 520 may share the convention that a new random key sequence is generated daily at a particular time, meaning that telephone 508 may generate its key sequence well before the user attempts to log in later that day.

In step 808 the user using client computer 504 wishes to log into the Web site hosted on backend server computer 506 and uses his or her computer to access the Web site via backend application 520. The user is presented with login window 610 as shown in FIG. 6 and turns on use of virtual keyboard using button 612. The user will also enter his user name in field 614. Once the user hovers the mouse (or touches with his finger, or otherwise selects) over password field 616 the virtual keyboard 710 will appear within the login window on the user's computer as shown in FIG. 7. Note that each of the twelve numeric keys is blank. Two of the keys may represent letters or other special characters (i.e., "*", etc.) as will be shown and described below. In fact, the "keys" set shown in the algorithm above may include characters other than numerals in order to fill up twelve keys or more.

In step 812 the application on the mobile telephone 108 displays a virtual keyboard having alphanumeric keys which is similar to keyboard 710 (except that the keys on keyboard 710 are blank). In one embodiment, the mobile telephone and backend application 520 have agreed a priori to use a particular virtual keyboard arrangement and the telephone may display its virtual keyboard 724 such as is shown in FIG. 9 by simply applying the key sequence obtained in step 804 to that keyboard. In this embodiment, it is not necessary to overlap the telephone with keyboard 710, not necessary to use a camera of the telephone, nor is it necessary to use any type of augmented reality (AR) in order to produce keyboard 724. The user may enter his password on virtual keyboard 710 by reference to keyboard 724 as will be described below in step 816. In an alternative embodiment, telephone 508 overlays keyboard 724 over keyboard 710 as a semi-transparent image as described above in step 426.

In a preferred embodiment, telephone 508 displays a virtual keyboard with keys using augmented reality in step 812. In this embodiment, an application on telephone 508 (or on a similar computing device having a camera) will detect virtual keyboard 710 using its camera and then superimpose (on the screen of the telephone) an additional virtual keyboard 724 having actual keys over keyboard 710. FIG. 8 shows a mobile telephone 508 that had been placed in front of computer 104 in front of keyboard 710; the application on the telephone has detected keyboard 710 and has rendered that same keyboard as keyboard 720 on the telephone. Once keyboard 710 has been detected telephone 508 may be moved off to the side as shown in FIG. 8.

Any of a variety of augmented reality (AR) software applications may be used upon mobile telephone 508 not only to render keyboard 720 but also to render keyboard 724. In one specific embodiment, the "Augmented Images" software in the ARCore development software available from Google, Inc. allows one to build an augmented reality application that can respond to two-dimensional images in the user's environment, such as a keyboard on the screen. The Augmented Images API is able to track and find an image seen through the viewfinder of a camera on the mobile telephone, and can provide an estimate for the position, orientation and physical size of that image. Preferably, the image of keyboard 710 should fill at least 25% of the camera frame in order to be initially detected, should be flat, and should be in clear view of the camera and not viewed at an oblique angle. As mentioned above, this AR application detects keyboard 710 and renders it as keyboard 720 on telephone 508.

FIG. 9 shows how the application on telephone 508 has now superimposed virtual keyboard 724 over the virtual keyboard 720. As explained above, while keyboard 720 has blank keys, keyboard 724 has keys with numbers or other alphanumeric characters that are respectively superimposed over each of the blank keys in keyboard 720, as if keyboard 720 actually had keys. Thus, a user may enter a password into keyboard 710 on computer 104 (even though those keys are blank) by using keyboard 724 as a reference.

In step 816 the user enters his or her password on virtual keyboard 710 on the client computer with reference to keyboard 724 on mobile telephone 508. As shown in FIG. 10, the user has already entered numerals 9, 1 and 8 by selecting corresponding positions on keyboard 710 (i.e., in the 4×3 grid of blank keys, by selecting the second key in the third row, the second key in the second row and then the third key in the third row). Using the mouse cursor of the client computer, the user is about to select the second key in the third row on keyboard 710, which corresponds to the numeral "9" on keyboard 724. As shown, a cursor 744 also appears over that corresponding key on keyboard 724 because the camera of telephone is viewing keyboard 710. As mentioned earlier, if the camera is not directly in front of the virtual keyboard 710 on the client computer it is still possible that the mobile telephone 508 also shows the finger cursor 744 on the screen of the mobile telephone because the user will angle the telephone to capture keyboard 710 in the viewfinder of the camera.

In an alternative, if the camera cannot capture the keyboard 710 the telephone display will not show keyboard 710 and the password "918" will not appear. The user, however, may still enter the password on keyboard 710 by reference to keyboard 724, and will have to remember the keys that he or she has entered.

Once the next key is pressed on keyboard 710 using the mouse (or other input), then display 754 on the mobile telephone will show the entire entered password "9189". Advantageously, client computer 104 is not aware of this password, only that a sequence of blank keys on keyboard 710 have been pressed. The mobile telephone is able to display the numerals "9189" because it is aware that these keys have been selected on the client computer. In one technique, even though the keys of virtual keyboard 710 are blank, each key will change color after being clicked, and the mobile telephone application will detect this color change and will thus know which key has been clicked. Of course, this only works when the camera is substantially in front of the virtual keyboard and its viewfinder can capture the virtual keyboard. In a variation, each key changes a pattern of its background, flashes a light or pattern, goes dark temporarily, etc., in order to make a visual change to a key that has been pressed that may be detected by the mobile application.

Using the convention shared with backend application 520, each blank key on keyboard 710 has a corresponding position number which may simply be in numerical ascending order going from top to bottom and from left to right. Accordingly, the entered position sequence known to the client computer will be "8, 4, 9, 8". Next, in step 820 the client computer sends this position sequence to the Web site hosted by backend server computer 506.

In step 824 the backend application 520 uses the virtual keyboard 528 it had previously generated, along with a priori knowledge of which position refers to which key on the keyboard arrangement that is in use, in order to obtain the actual password entered by the user. In this example, since the position sequence is "8, 4, 9, 8" the application applies that to keyboard 528 in order to obtain an entered password of "9189."

Finally, the backend application uses that entered password to compare against the registered password for the user corresponding to the user name entered and determines whether or not the login should be allowed. If the passwords match then the user is allowed to log in to the Web site via the backend application, but if the passwords do not match the user is not allowed login. Advantageously, malicious software (whether executing upon the client computer or in another location) is not able to steal the user's password because that password is never entered directly upon the client computer and a password is never transmitted between the client computer and backend server computer 106.

Additional Embodiments

The invention also includes these additional embodiments.

D1. In a client computer, a method of entering a user password, said method comprising:

receiving a login window from an application of a remote server computer over a network connection;

inputting a user identifier for an electronic user account of said application into said login screen on said client computer;

displaying a blank virtual keyboard having blank keys on said client computer;

inputting a user selection of a plurality of said blank keys of said virtual keyboard, said user selection forming a position sequence; and sending said user identifier and said position sequence to said application of said remote server computer, wherein a password of said electronic user account being represented by said position sequence.

D4. A method as recited in claim D1 further comprising:

displaying a key sequence on keys of a virtual keyboard on a mobile computing device.

D5. A method as recited in claim D4 further comprising:
  mapping, by said application, said position sequence onto said key sequence to produce a user password of said electronic user account; and
    logging in said client computer to said application on the basis of said input user identifier and said produced user password.
D6. A method as recited in claim D1 wherein said password corresponding to said electronic account of said user is not present on said client computer.
D7. A method as recited in claim D5 further comprising:
  generating, by said mobile computing device, said key sequence using a pseudo random number generator having a seed; and
    generating, by said application, said key sequence using said pseudo random number generator having said seed.
D8. A method as recited in claim D4 wherein said mobile computing device is held substantially in front of said blank virtual keyboard so that said blank virtual keyboard is captured by a camera of said mobile computing device and appears on a display of said mobile computing device, said method further comprising:
  overlaying said key sequence over said blank virtual keyboard on said display.
D9. A method as recited in claim D8 further comprising:
  detecting, by an application of said mobile computing device, a user selection of one of said blank keys; and
  displaying the corresponding numeral of said key sequence on said display.
D10. A method as recited in claim D4 wherein a camera of said mobile computing device does not capture said blank virtual keyboard, said method further comprising;
  not displaying a corresponding numeral of said key sequence on said display when a user selection of one of said blank keys is input.
E1. In a mobile computing device, a method of displaying a virtual keyboard, said method comprising:
  generating, by an application of a remote server computer, a key sequence of alphanumeric characters using a pseudo random number generator having a seed;
  generating, by said mobile computing device, said key sequence of alphanumeric characters using said pseudo random number generator having said seed;
  generating a mobile virtual keyboard and locating said key sequence in a predetermined order on keys of said virtual keyboard; and
  displaying said mobile virtual keyboard having said key sequence on said mobile computing device.
E4. A method as recited in claim E1 further comprising:
  inputting into a blank virtual keyboard on a client computer a position sequence, wherein a mapping of said position sequence onto said mobile virtual keyboard generates a password of an electronic account of a user of said client computer.
E6. A method as recited in claim E4 wherein said password corresponding to said electronic account of said user is not present on said client computer.
E7. A method as recited in claim E4 further comprising:
  sending a user identifier and said position sequence to said application of said remote server computer, wherein a password of said electronic user account being represented by said position sequence and said key sequence.
E8. A method as recited in claim E1 further comprising:
  scanning an image of a blank virtual keyboard having blank keys on said screen of said client computer and displaying said image of said blank virtual keyboard on said mobile computing device; and
  superimposing said mobile virtual keyboard having said key sequence over said blank keyboard such that both said blank virtual keyboard and said virtual keyboard having said key sequence are visible on said mobile computing device.
E9. A method as recited in claim E1 wherein said mobile computing device is held substantially in front of said blank virtual keyboard so that said blank virtual keyboard is captured by a camera of said mobile computing device and appears on a display of said mobile computing device, said method further comprising:
  overlaying said key sequence over said blank virtual keyboard on said display.
E10. A method as recited in claim E9 further comprising:
  detecting, by an application of said mobile computing device, a user selection of one of said blank keys; and
  displaying the corresponding numeral of said key sequence on said display.
E11. A method as recited in claim E1 wherein a camera of said mobile computing device does not capture said blank virtual keyboard, said method further comprising;
  not displaying a corresponding numeral of said key sequence on said display when a user selection of one of said blank keys is input.
F1. In a server computer, a method of receiving a user password, said method comprising:
  generating, by an application of said server computer, a key sequence of alphanumeric characters using a pseudo random number generator having a seed;
  receiving, from a client computer over a network connection, a user identifier corresponding to electronic user account and a position sequence from a virtual keyboard on said client computer; and
  determining a password of said electronic account by mapping said position sequence onto said key sequence of alphanumeric characters; and
  logging in said client computer to said application when it is determined that said determined password matches a stored password in a database of said application corresponding to said electronic user account.
F4. A method as recited in claim F1 further comprising:
  displaying said key sequence on a mobile virtual keyboard on a mobile computing device.
F5. A method as recited in claim F4 further comprising:
  generating, by said mobile computing device, said key sequence using said pseudo random number generator having said seed;
  locating said key sequence in a predetermined order on keys of said mobile virtual keyboard.
F6. A method as recited in claim F1 wherein said password corresponding to said electronic account of said user is not present on said client computer.
F8. A method as recited in claim F4 further comprising:
  scanning an image of a blank virtual keyboard having blank keys on a screen of said client computer and displaying said image of said blank virtual keyboard on said mobile computing device; and
  superimposing said mobile virtual keyboard having said key sequence over said blank keyboard such that both said blank virtual keyboard and said virtual keyboard having said key sequence are visible on said mobile computing device.

Computer System Embodiment

Figure 12A:
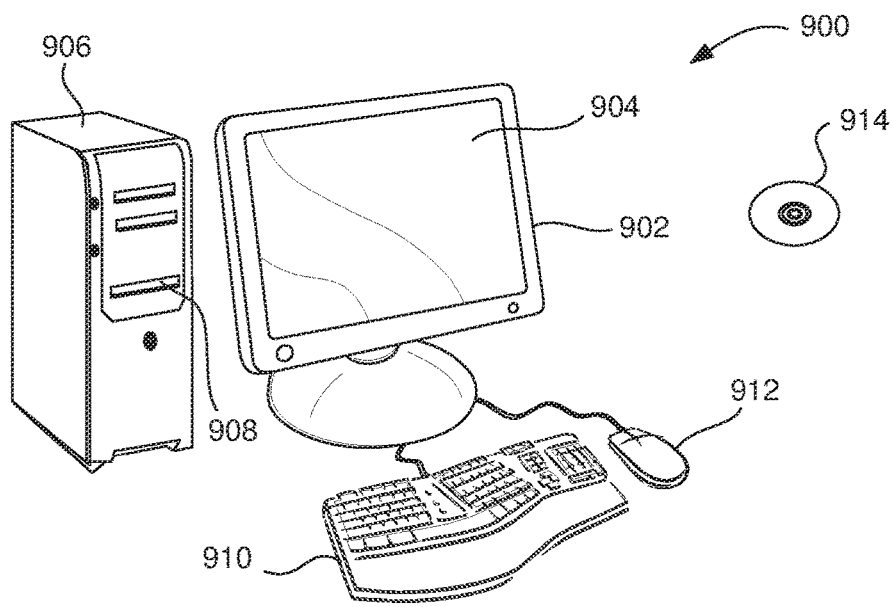
FIGS. 12A and 12B illustrate a computer system suitable for implementing embodiments of the present invention.
Figure 12B:
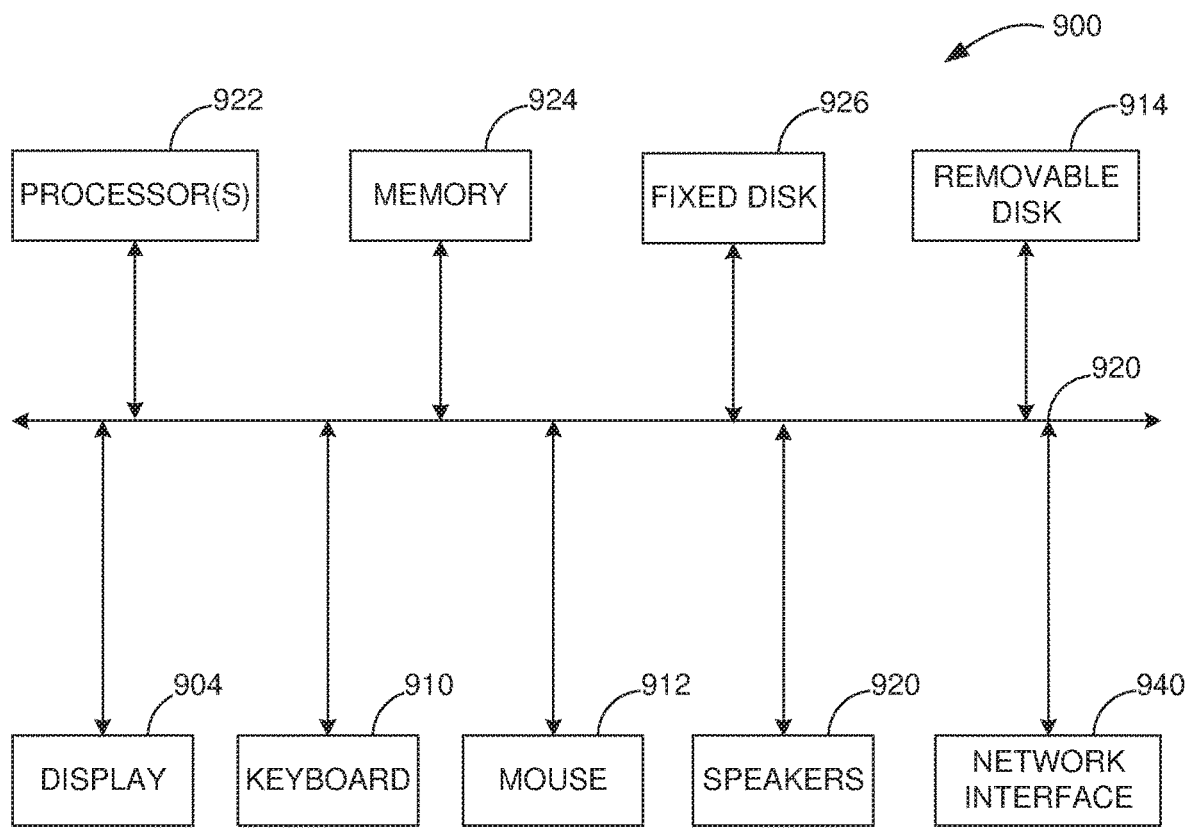

FIGS. 12A and 12B illustrate a computer system 900 suitable for implementing embodiments of the present invention. FIG. 12A shows one possible physical form of the computer system. Of course, the computer system may have many physical forms including an integrated circuit, a printed circuit board, a small handheld device (such as a mobile telephone or PDA), a personal computer or a super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 12B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary mass storage medium (such as a hard disk, a solid-state drive, a hybrid drive, flash memory, etc.) that can be slower than primary storage but persists data. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

We claim:

1. In a client computer, a method of entering a user password, said method comprising:
    inputting a user identifier for an electronic account of a user and sending said user identifier to an application of a server computer;
    in response to said sending, receiving, from said application of said server computer, an encoded image representing an encrypted key sequence of alphanumeric characters having been encrypted with a public key of said user, said application generating a layout of said alphanumeric characters on a particular keyboard arrangement;
    displaying said encoded image on said client computer such that it may be scanned by a camera of a mobile computing device;
    scanning said encoded image by said mobile computing device and decoding said encoded image to produce said encrypted key sequence of alphanumeric characters;
    decrypting said encrypted key sequence with a private key corresponding to said public key and displaying said key sequence of alphanumeric characters on a first virtual keyboard having said particular keyboard arrangement on said mobile computing device;
    displaying blank keys on a second virtual keyboard having said particular keyboard arrangement on said client computer;
    inputting a user selection of a plurality of said blank keys of said second virtual keyboard, said user selection forming a position sequence that represents a password of said electronic account of said user, wherein said first virtual keyboard on said mobile computing device is used as a reference but does not overlap with said second virtual keyboard on said client computer during said inputting; and
    sending said position sequence to said application of said server computer, wherein said application obtains said password of said electronic account of said user from said position sequence, and wherein said client computer has no access to said password of said electronic account of said user via said input position sequence.

2. A method as recited in claim 1 wherein said encoded image is a barcode.

3. A method as recited in claim 1 wherein said encoded image is a two-dimensional barcode.

4. A method as recited in claim 1 further comprising:
    mapping, by said application, said position sequence onto a decrypted encrypted key sequence to produce a user password of said account; and
    logging in said client computer to said application on the basis of said input user identifier and said produced user password.

5. In a handheld mobile computing device, a method of displaying a virtual keyboard, said method comprising:
    scanning with a camera of said handheld mobile computing device an encoded image on a screen of a client computer, said encoded image representing an encrypted key sequence of alphanumeric characters having been encrypted with a public key of a user in an application of a server computer, said application generating a layout of said alphanumeric characters on a particular keyboard arrangement;

decoding said encoded image to produce said encrypted key sequence of alphanumeric characters;

decrypting said encrypted key sequence with a private key corresponding to said public key to produce a key sequence of alphanumeric characters;

generating a first virtual keyboard having said particular keyboard arrangement and locating said key sequence in a predetermined order on keys of said first virtual keyboard;

displaying said first virtual keyboard having said key sequence of alphanumeric characters on said handheld mobile computing device; and receiving input into a blank second virtual keyboard having said particular keyboard arrangement on said client computer a position sequence, wherein during said receiving said first virtual keyboard is used as a reference but does not overlay said blank second virtual keyboard, wherein said position sequence is sent to said application of said server computer, wherein a mapping of said position sequence onto said layout generates a password of an electronic account of a user of said client computer, and wherein said client computer has no access to said password corresponding to said electronic account of said user via said input position sequence.

6. A method as recited in claim 5 wherein said encoded image is a barcode.

7. A method as recited in claim 5 wherein said encoded image is a two-dimensional barcode.

8. A method as recited in claim 5 further comprising:

encrypting, by an application of a server computer, a random key sequence to produce said encrypted key sequence; and encoding said encrypted key sequence and transmitting said encoded encrypted key sequence to said client computer.

9. In a server computer, a method of receiving a user password, said method comprising:

receiving a user identifier corresponding to electronic account of user over a network connection from a client computer;

retrieving a public key from a database using said user identifier;

generating a random sequence of alphanumeric characters, said random sequence representing a particular keyboard arrangement;

encrypting said random sequence with said public key and encoding said random sequence to produce an encoded image;

sending said encoded image to said client computer for display;

scanning said encoded image displayed on said client computer by a mobile computing device and decoding said encoded image to produce said encrypted key sequence of alphanumeric characters;

decrypting said encrypted key sequence with a private key corresponding to said public key and displaying said key sequence of alphanumeric characters on a first virtual keyboard having said particular keyboard arrangement on said mobile computing device;

displaying blank keys on a second virtual keyboard having said particular keyboard arrangement on said client computer, wherein said first virtual keyboard on said mobile computing device is used as a reference but does not overlap with said second virtual keyboard on said client computer during input of a position sequence on said client computer, said position sequence representing a password of an electronic account of said user;

receiving said position sequence from said client computer; and determining said password of said electronic account by mapping said position sequence onto said random sequence of alphanumeric characters, and wherein said client computer has no access to said password corresponding to said electronic account of said user via said input position sequence.

10. A method as recited in claim 9 wherein said encoded image is a barcode.

11. A method as recited in claim 9 wherein said encoded image is a two-dimensional barcode.

12. A method as recited in claim 9 further comprising:

logging in said client computer to an application of said server computer on the basis of said input user identifier and said determined user password.

* * * * *